United States Patent [19]
Mills

[11] Patent Number: 5,404,063
[45] Date of Patent: Apr. 4, 1995

[54] ELECTROMAGNETIC CENTER CORE DYNAMO

[76] Inventor: Herbert W. Mills, P.O. Box 594, Stinnett, Tex. 79083-0594

[21] Appl. No.: 87,593

[22] Filed: Jul. 1, 1993

[51] Int. Cl.$^6$ ............................ H02K 1/22; H02K 1/12
[52] U.S. Cl. ..................................... 310/266; 310/254
[58] Field of Search ...................... 310/114, 266, 254

[56] References Cited

U.S. PATENT DOCUMENTS

| | | | |
|---|---|---|---|
| Re. 23,021 | 7/1948 | Suydam | 310/40 R |
| 465,808 | 12/1891 | Thury | 310/266 |
| 561,144 | 6/1896 | Trudeau | 310/266 |
| 566,889 | 9/1896 | Bram | 310/40 R |
| 1,675,960 | 7/1928 | Schon et al. | 310/266 |
| 1,736,551 | 11/1929 | Schou | 310/162 |
| 1,856,146 | 5/1932 | Wolkoff | 310/40 R |
| 1,936,737 | 11/1933 | Tingley | 210/269 |
| 2,045,831 | 6/1936 | Carbonara | 310/114 |
| 2,837,670 | 6/1958 | Thomas et al. | 310/266 |
| 3,538,364 | 11/1970 | Favereau | 310/266 |
| 3,555,330 | 1/1971 | Svecharnik | 310/266 |
| 4,532,447 | 7/1985 | Cibie | 310/114 |
| 5,004,944 | 4/1991 | Fisher | 310/266 |

FOREIGN PATENT DOCUMENTS

| | | | |
|---|---|---|---|
| 198881 | 8/1960 | Denmark | 310/266 |
| 312273 | 11/1933 | Italy | 310/266 |
| 1165422 | 10/1969 | United Kingdom | 310/266 |
| WO93/08634 | 4/1993 | WIPO | 310/266 |

*Primary Examiner*—Steven L. Stephan
*Assistant Examiner*—Clayton E. LaBalle
*Attorney, Agent, or Firm*—Brian D. Smith; Sandeep Seth

[57] ABSTRACT

A dynamo having an improved three piece stator system is disclosed. The dynamo stator system includes a physically continuous center winding located between two outer windings such that the configuration provides a strong series magnetic axis across the stator system to generate increased power output. The dynamo further includes a rotor system having a lateral offset mount which enables the rotor poles to rotate about the center winding. The dynamo further includes electrically coupling between the stator system elements to further increase the efficiency of the dynamo during operation and to reduce operational losses. In addition, magnetic insulation means is provided to insulate the rotor and stator elements. Brush means having a plurality of successive brush elements wherein each element has greater resistance than the previous element to further decrease operational losses is additionally provided.

17 Claims, 3 Drawing Sheets

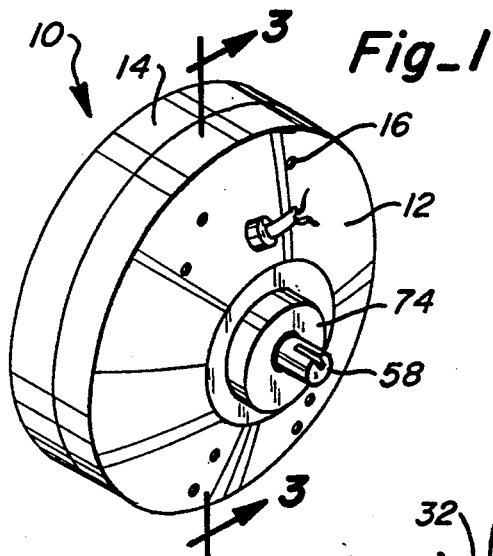
Fig_1
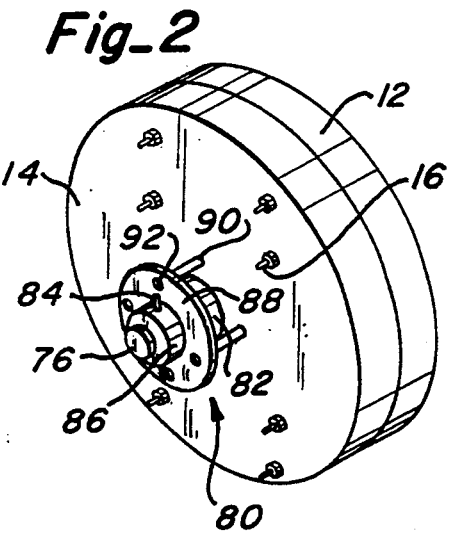
Fig_2
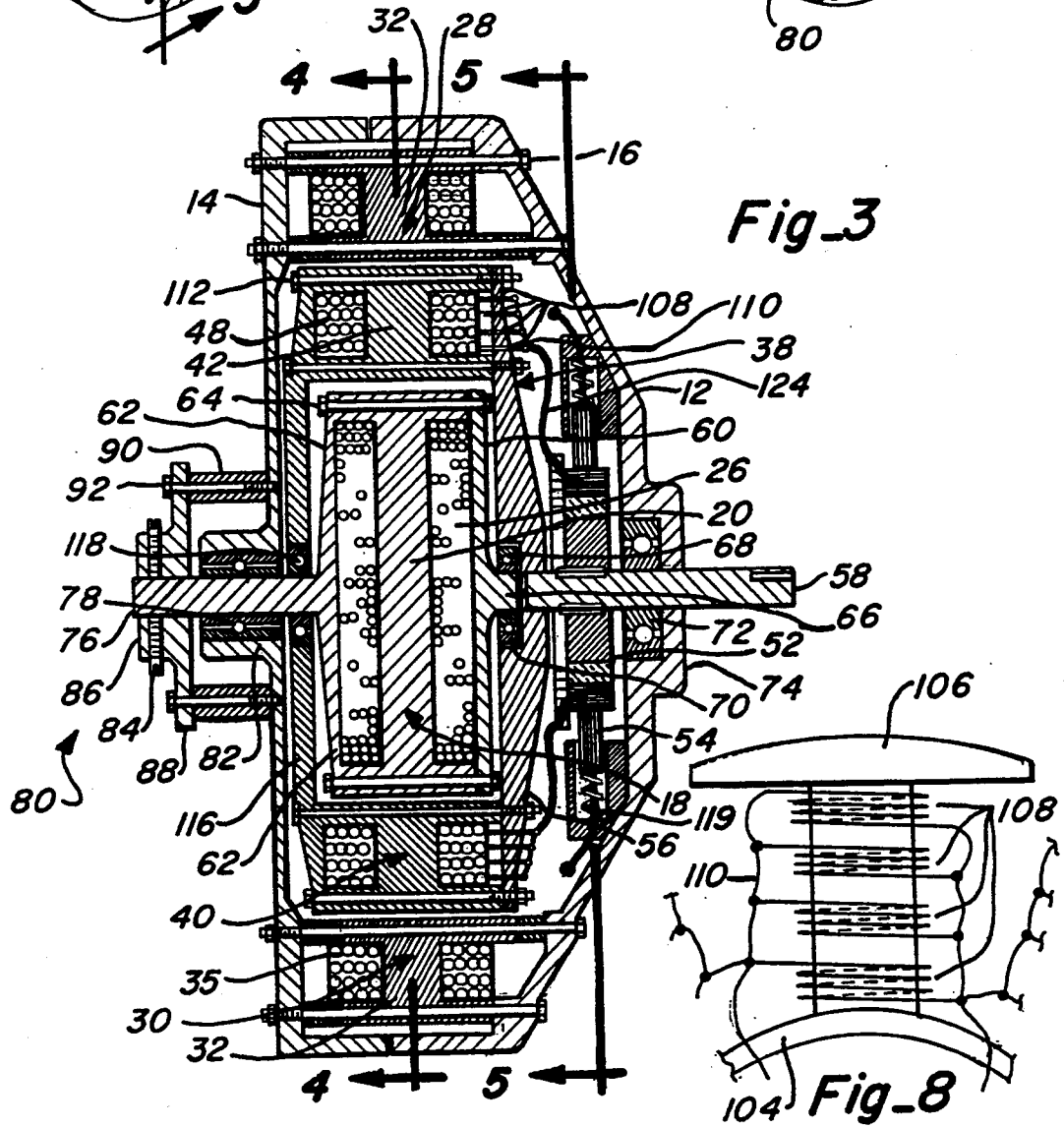
Fig_3
Fig_8

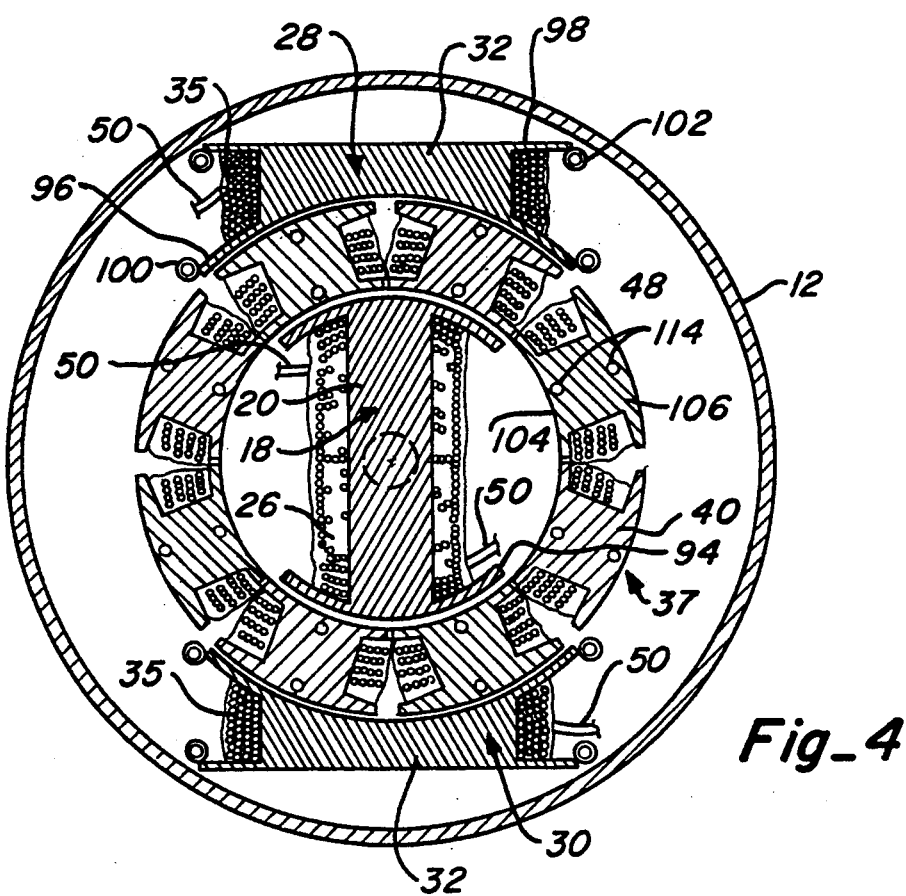
Fig_4
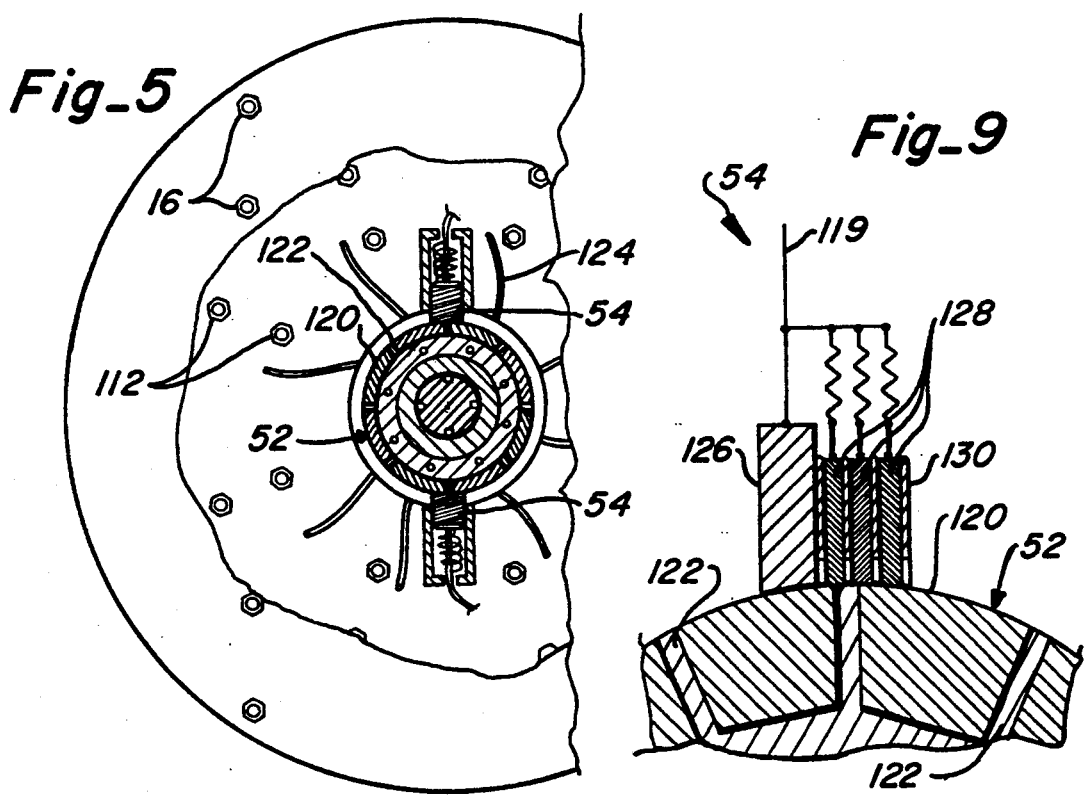
Fig_5
Fig_9

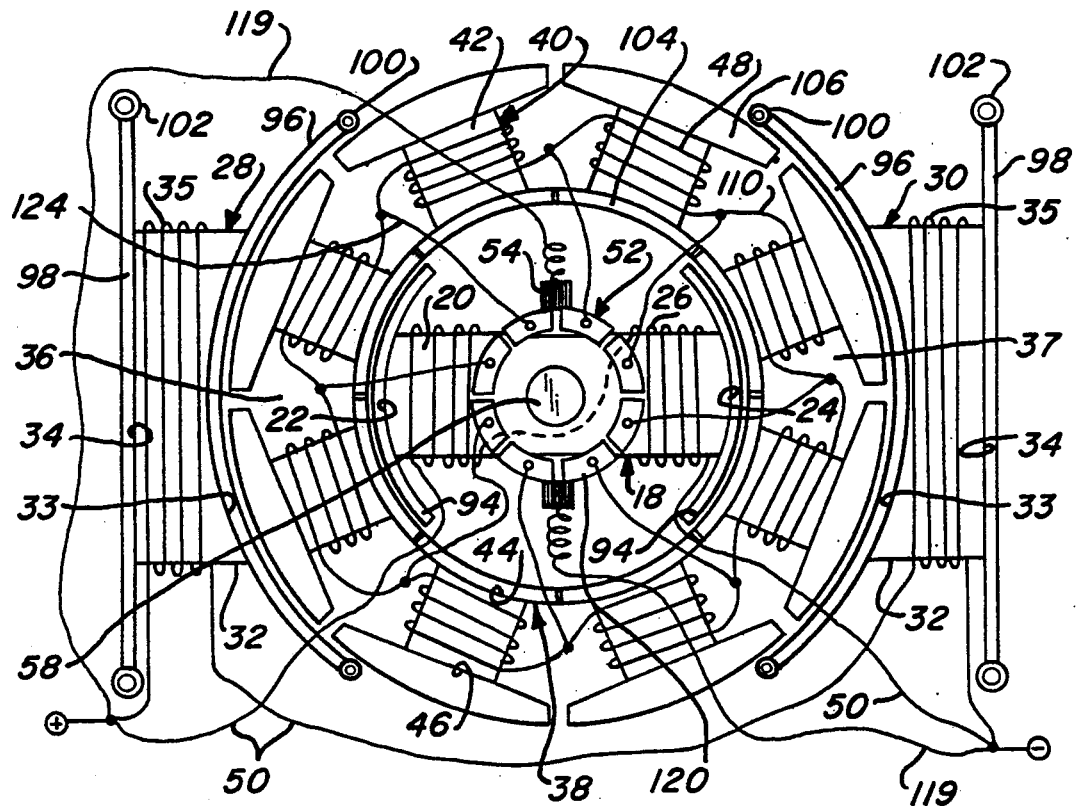
Fig_6
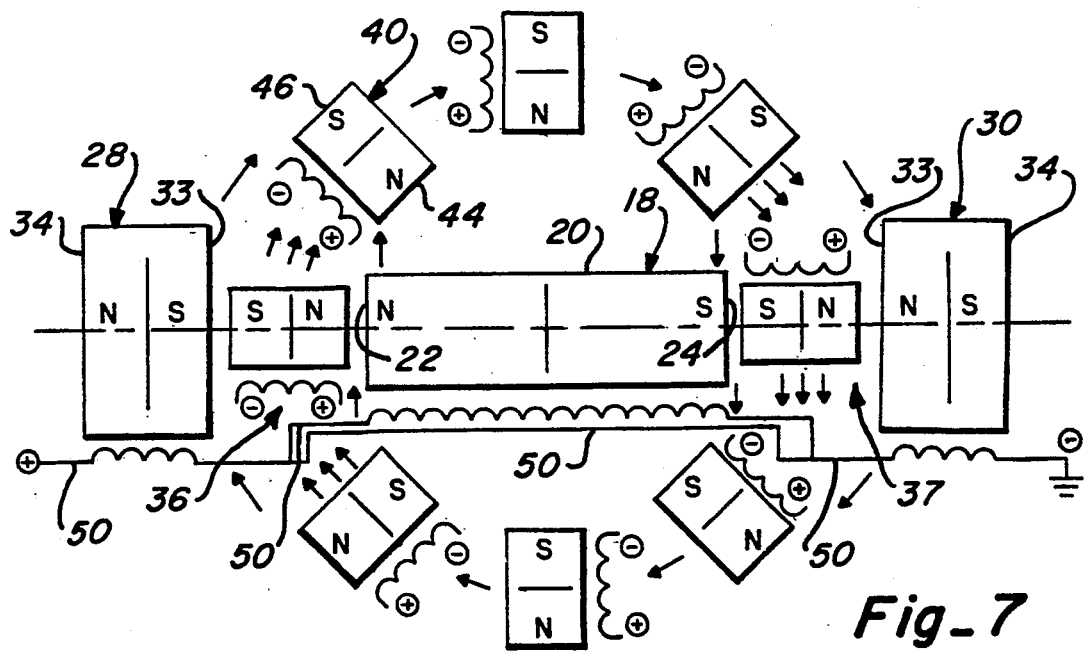
Fig_7

ELECTROMAGNETIC CENTER CORE DYNAMO

THE TECHNICAL FIELD

This invention relates generally to dynamos and, more particularly, has for one of its objects the provision of devices in the class named utilizing a unique three piece stator system of which more efficiently utilizes electromagnetic forces and effects to provide for improved operation.

BACKGROUND

Modern industrial society is now facing energy and environmental concerns on a global scale as a by-product of energy consumed and pollution produced by industrial and residential energy producers and energy consumers. One environmental concern receiving considerable attention is the presence of global warming created by the green-house effect resulting from the tremendous output of carbon monoxide into the atmosphere. Another such concern is the reduction in air quality in heavily populated centers resulting from the high carbon monoxide output. Numerous studies have shown that a primary contributor to the level of carbon monoxide in the atmosphere is the use of gasoline driven internal combustion motors in automobiles. Numerous studies have also shown that the fossil fuels necessary to produced the fuel required to power such motors are subject to depletion. The use of automobiles is not subject to ready change or diminishment in modern society. However, one way to alleviate the problem of production of green-house gases and reduced air quality caused by internal combustion engines, and to further conserve fossil fuels required to power such engines, is to employ electric motors in commuter cars. For the foregoing reasons, there is a need for an electric motor capable of propelling a car that will use less energy and run for a longer period of time than current electric motors.

To create enough horsepower to drive a car, an electrical motor must be designed to more fully harness electromagnetic forces and effects so that its power factor is sufficiently high to make the use of batteries as a feasible power source. Since dynamos are utilized in all industries, however, either to generate electrical or mechanical energy, such a more efficient design would generate more useful energy and result in less pollution in any industrial application.

Previous patents demonstrate that previous motor designs, while useful for their intended purpose and intended improvement, do not fully harness electromagnetic forces and effects to be sufficiently efficient. For example, U.S. Pat. No. 666,949, given to Bram, discloses a two pole AC/DC motor with ventilated field magnet cores and a large diameter armature rim. The design somewhat minimizes excess magnetic conductance and eddy currents produced during operation. The Bram motor, however, does not use, or suggest using, the bi-polarity of its armature posts to result in having the stator elements provide greater electromagnetic torque to them. Furthermore, the Bram motor does not use, or suggest using, either voltage transients produced in the armature, or armature counter-emf's, to increase the power output and efficiency of the motor. The Bram motor utilizes a traditional stator system, a conventional shaft mounted armature and commutator, and armature bobbins which are more easily wound. U.S. Pat. No. 1,866,156 to Wolkoff discloses a four stator pole electric dynamo whereby the rotation of a toroidal armature can be reversed and the speed of the motor varied by movement of the brushes. Wolkoff's motor achieves its power to size ratio by breaking each pole into an inner piece and an outer piece. Each inner piece is coaxially placed within the armature. Each outer piece concentrically surrounds the armature. However, the Wolkoff motor does not offer a physically and electromagnetically continuous center winding, or a combination allowing the use of a such a continuous center winding, to establish a strong magnetic axis between the inner and outer poles. In fact, the provision of a physically and electromagnetically continuous center core electromagnet is not possible in the Wolkoff design for two reasons. First, the shaft runs through the Wolkoff motor. Second, each pole pair utilizes like magnetic poles, rather than opposite poles, as required for a continuous magnetic axis. Furthermore, the use of four stator poles is inconsistent with the present invention.

Reissue U.S. Pat. No. 23,021, to Suydam, discloses an induction motor utilizing L-shaped terminated conductor bars comprised of magnetized laminated plates, rather than a field winding armature, to form both the armature and commutator of the motor. The motor uses a set of laminated magnetic metal plates mounted on a stationary portion of its shaft to provide a limited form of magnetic continuity to the motor. This motor does not take advantage of, or is configured to capture and utilize, counter emf's and voltage spikes generated in the armature to increase the power factor of the motor. It discloses only a non-continuous magnetic core rather than a continuous electromagnetic core electrically connected to the outer windings.

U.S. Pat. No. 1,744,551 to Shou discloses a flywheel dynamo, in which the outside surface of the rotor is used as a pulley. The dynamo reverses the traditional rotor and stator positions by placing the rotor outside of the stator. In Shou, however, no portion of the stator is located outside of the rotor to utilize bi-polar rotor ends. The annular stator, mounted on a spider, does not provide a continuous center stator element for the dynamo.

The foregoing patents disclose various motors which, while utilizing some electromagnetic forces and effects, do not create the efficiency required as an object of the present invention. Specifically, none of the prior art uses a physically and electromagnetically continuous center winding as part of an improved three piece stator system which produces greater magnetic torque to the rotor. Providing such a stator system is an object of the present invention. A further object of this invention to employ voltage transients and counter-emf's in the armature poles to further increase the magnetic torque to the rotor system provided by the stator system. Another object of the present invention to capture and utilize the same voltage transients and counter-emf's to raise the system voltages of both the rotor and stator systems to thereby decrease the required energy input to the dynamo for any specified operation. Additional objects, advantages and novel features of the invention shall be set forth in part in the descriptions that follow, and in part will become apparent to those skilled in the art upon examination of the following or may be learned by the practice of the invention. The over-arching object of the present invention is to provide a dynamo of increased efficiency which positively impacts energy and environmental concerns on a global scale.

DISCLOSURE OF THE INVENTION

Against the described background, the present invention provides an improved electromagnetic dynamo of greater efficiency which achieves the above mentioned goals. In accordance with the invention, the dynamo includes an improved three piece stator system which produces greater magnetic induction to the dynamo's rotor system and decreases the necessary energy input to the dynamo. The primary and unique element of the system, an electromagnetic center field winding, is independently rotatably mounted within a non-magnetic housing by non-magnetic front and rear supports. The center field winding, which provides a strong magnetic axis across the dynamo, has a physically continuous elongated ferromagnetic core with two ends of opposite magnetic polarity. A pair of first and second outer field windings, fixedly mounted to the housing, form the second and third elements of stator system and complete the strong magnetic axis across the dynamo. The outer field windings, each having an inner end and an outer end, are generally centered about the longitudinal axis of said center core field winding and spaced on opposite sides thereof. Each inner end faces a respective opposite end of the center winding wherein the magnetic polarity of each outer winding's inner end is opposite to that of the center field winding's adjacent opposite end. The stator configuration, therefore, is in magnetic series and acts as a broken bar magnet having two gaps. This configuration results in a dynamo of greater efficiency and power than one not provided with a center winding in magnetic series with two outer windings.

The dynamo further includes a rotor system having armature means for rotating armature poles about the center field winding without any element of the rotor system, including the drive shaft of the motor, intersecting the center field winding. The armature means has a plurality of pole windings, each of which has two opposite ends with opposite polarities. As the armature means rotates, the pole windings pass through the two gaps formed between the inner ends of the outer field windings and the adjacent ends of the center field winding. The armature means is designed so that it does not intersect the center winding. Therefore, the center winding remains physically continuous.

In accordance with an important aspect of the present invention, a preferred embodiment is provided with electrical connection means to electrically connect together the individual elements of the stator system. The connection means advantageously provides an electrical pathway for transient voltages and counter emf's in the armature poles, which are electrically induced into the center winding, to be conducted through the stator system. The increased system voltage of the stator system thereby results in greater dynamo efficiency. Operational heat losses are also reduced thereby. The connection means may create either a series or parallel electrical path between the center winding and outer field windings, except in the case of A.C. power input to the dynamo, wherein the electrical path between all the stator elements must be series. It is preferred that a magnetic balance exist between the center winding and the outer windings. Therefore, the current through each stator system element and the number of winding turns per unit length of each element should be equal.

The present invention includes conventional commutator means for reversing the polarity of the armature poles and brush means for transferring power to/from the commutator means. In a preferred embodiment, each brush means has a plurality of brush elements which incrementally transition the power to/from the commutator means to reduce brush sparking. The dynamo may also by adapted for use with electronic brushless system.

In a preferred embodiment of the present invention, the armature is mounted on a unique laterally offset mounting means. The laterally offset mounting means rotatably supports the front of the armature means while rigidly connecting a drive shaft to the armature means such that neither the armature means nor the drive shaft intersect the center field winding. To provide rear rotatable mounting for the armature means in that preferred configuration, and to dampen armature vibration during rotation, the dynamo includes armature stabilization means. The stabilization means also secures each armature pole as a coherent body while maintaining each armature pole physically independent from each adjacent one to reduce electrical and magnetic interference between them.

In a preferred embodiment of the present invention, the center field winding independent supports, the laterally offset mounting means, and the armature rear stabilization means are made of non-magnetic material. This concentrates magnetic flux along the magnetic axis of the stator system and limits available magnetic conductance pathways for stray eddie currents.

In a preferred embodiment of the present invention, means is also provided for increasing the conductance of the inner ends of the outer windings and the opposite ends of the center winding which increases the magnetic field strength of the stator system.

During operation, the dynamo of the present invention experiences a voltage boost to the rotor and stator system and increased torque to the rotor system by the stator system. As a result, the level of operating current necessary to maintain a desired steady state r.p.m. with a load applied is diminished in motor mode. Conversely, less physical energy is required to maintain a specified electrical current output in generator mode.

BRIEF DESCRIPTION OF THE DRAWINGS

The invention will be more readily understood by reference to the accompanying drawings wherein like reference numerals indicate like elements throughout the drawing figures, and in which:

FIG. 1 is a perspective view of an encased motor of the present invention showing the front half of a motor housing and front drive shaft.

FIG. 2 is a perspective view of the encased motor showing the rear adjustment shaft and lock plate.

FIG. 3 is a vertical section, taken along line 1—1 of FIG. 1, of the motor showing the stator system and the laterally offset mounting of the rotor/drive shaft.

FIG. 4 is a vertical section, taken along the line 4—4 of FIG. 3, showing the armature and field windings.

FIG. 5 is a partial vertical section, taken along the line 5—5 of FIG. 3, showing the commutator and brush elements.

FIG. 6 is an exploded top view of the motor showing the rotor and stator systems of the motor and the commutator/brush segments.

FIG. 7 is an electrical and magnetic schematic of the motor during operation.

FIG. 8 is an exploded elevation view showing an armature pole winding.

FIG. 9 is an exploded elevation view showing a brush element comprised of four brushes.

DETAILED DESCRIPTION OF THE PREFERRED EMBODIMENT

FIGS. 1 through 8 illustrate an improved electromagnetic dynamo 10 of the present invention which achieves greater power efficiency and reduces losses created through heat, eddy currents, and brush sparking. FIG. 1 shows dynamo 10 encased by a front half housing 12 and a rear half housing 14. The two housings are secured together by a plurality of housing bolts 16 and are comprised of a non-magnetic material to magnetically insulate dynamo 10.

In accordance with an essential aspect of the present invention, as best seem in FIG. 6, a center field winding 18 is provided within the housing as the primary element of a three piece stator system which creates a strong magnetic axis across dynamo 10. Center field winding 18 has a physically continuous ferromagnetic core 20 with two opposite facing ends 22, 24. Windings 26, of 14 gauge copper enameled magnetic wire, are also provided, as illustrated, which are wound around core 20 such that, when energized, a first magnetic pole is created at one of said ends 22 and a second magnetic pole of opposite polarity to the first magnetic pole is created at said opposite end 24. To complete the strong stator magnetic axis across the dynamo 10, a pair of first 28 and second 30 outer field windings are provided which comprise the remaining two pieces of the three piece stator system. The outer field windings 28, 30 are generally centered about the longitudinal axis of said center field winding 18 and spaced on opposite sides thereof. Each outer winding 28, 30 has a ferromagnetic core or body 32 with an inner end 33 facing an adjacent end of said center field winding 18 and spaced therefrom creating a gap therebetween. The outer windings 28, 30 each also have an outer end 34 which faces outwardly away from center field winding 18. Windings 35, also of 14 gauge copper enamelled magnetic wire, are also provided, as illustrated, which are wound around each outer winding's ferromagnetic body 32 such that, when energized, the magnetic polarity of each inner end 33 is opposite that of the adjacent end 22, 24 of the center field winding 18 which it faces. As shown schematically in FIG. 7, this magnetic configuration creates a series magnetic axis which acts as a bar magnet broken at a first gap (or space) 36 and a second gap (or space) 37. Unlike conventional motors, where like magnetic poles of adjacent winding or permanent magnet pairs are typically placed in conjunction with one another, the south magnetic pole of outer field winding 28 faces the north magnetic pole of center field winding 18; and the south magnetic pole of center winding 18 faces the north pole of outer winding 30. As such, this three piece stator system provides magnetic continuity to create a strong stator system series magnetic axis along line A-B across the dynamo 10.

Dynamo 10 of the present invention is further provided with a rotor system including an armature, or armature means, 38 for rotating a plurality of armature poles or bi-polar pole windings 40 about the center field winding 18 without any element of the rotor system intersecting the center field winding 18. Armature 38 is generally centered about the longitudinal axis of the center field winding 18 and oriented such that the longitudinal axis of the center field winding 18 is parallel to the orbital plane in which the armature 38 rotates. Each pole winding 40 has a ferromagnetic core 42 with opposite ends 44, 46. Windings 48, of 14 gauge copper enamelled magnetic wire, are also provided which are wound around each pole winding's core 42 in a uniform direction which, when energized, create a magnetic pole at one end 44 and an opposite magnetic pole at the opposite end 46. As the armature means 38 rotates, the bi-polar pole windings 40 pass through the gaps 36, 37 located between inner ends 33 of outer windings 28, 30 and the opposite ends 22, 24 of center winding 18. As it approaches a gap, the pole winding 40 experiences magnetic attraction at each of its opposite ends 44, 46 due to the stator elements. As it leaves a gap, the pole winding 40 experiences magnetic repulsion at each of its opposite ends 44, 46 due to the stator elements.

In accordance with another important aspect of the present invention, electrical connectors, or electrical connection means, 50 are provided to electrically connect the outer field windings 28, 30 and the center field winding 18. The electrical connectors 50 create an electrical pathway between the stator elements allowing voltage spikes and counter emf's in the pole windings 40, which are electrically induced into the stator system, to be conducted throughout the stator system. As a result, the system voltage of the stator system is increased resulting in higher power factor. This also results in increased efficiency due to reduced operational heat losses.

As shown, a commutator, or commutator means, 52 is provided to reverse the magnetic polarity of the pole windings 40 as the armature 38 rotates. In motor mode, a brush, or power transfer means, 54 cooperates with the commutator 52 to transmit electrical power to the commutator 52 and, in turn, to the pole windings 40.

As best seen in FIG. 3, in a preferred embodiment of the present invention, a laterally offset mount, or means, 56 is also provided to rotatably support the front of armature 38 and to rigidly mount a front drive shaft 58 such that neither the front shaft 58 nor the armature 38 intersects the center field winding 18. To accomplish this, drive shaft 58 is positioned to one side of the center field winding 18 with the longitudinal axis of the drive shaft 58 perpendicular to that of the center field winding 18 and axially aligned with the rotational axis of the armature 38. The unique configuration of the lateral offset mount 56 transmits torque between the drive shaft 58 and the armature 38 with the center winding 18 remaining physically continuous, ie. unbroken. The physical continuity of the center winding 18 is an important feature of the present invention as it enhances the strength of the magnetic attraction between the stator system elements thereby increasing the magnetic torque applied to armature 38 by center winding 18 and outer field windings 28, 30. Furthermore, the physical continuity of the center winding 18 results in a higher induced voltage increase of the stator system voltage than would occur without the physical continuity. Physical continuity of the center winding 18 is herein defined as having no macroscopic discontinuities, i.e. those visible to the naked eye, in either a solid core or a laminated core.

The preferred embodiment of the present invention is now described in greater mechanical detail. As illustrated in FIG. 3 and FIG. 6, the center winding 18 is rotatably suspended within front half 12 and rear half 14 housings. Center winding 18 is sandwiched between a front mount plate 60 and a rear mount plate 62 as by a plurality of bolts 64. The front plate 60 has an integral central portion 66 upon which bearing 68 is journaled. Bearing 68 is housed within an inner facing central recessed area 60 of lateral offset mount 56. The front drive shaft 58 is rigidly attached to the lateral offset mount 56 and coaxially aligned with bearing 68. The front drive shaft 58, further, is journaled within a support bearing 72 which is nested in an extension 74 of front housing 12. The front drive shaft 58 and lateral offset mount 56, in combination, thereby supports the front, or right side, of center winding 18 as it is shown in FIG. 3. As shown in FIG. 1, the front drive shaft 58 extends from the front half housing 12 through a bore (not numbered) in housing extension 74.

A rear adjustment shaft 76, as shown, is integrally formed with the rear mount plate 62 and journaled within a support bearing 78. Rear shaft 76 may also be a separate element but must be rigidly attached to rear mount plate 62. Thus, it will be appreciated that center winding 18 is independently and rotatably supported within halves 12, 14 on bearings 72 and 78.

FIG. 2 illustrates a rear lock plate assembly 80, which allows the center winding 18 to be rotated for small angular adjustment. Rear adjustment shaft 76 extends through a protrusion 82 in rear half housing 14 and is secured in place by a lock screw 84 which is threaded in a bore (not numbered) provided in a protrusion 86 of a lock plate 88. Lock plate 88, as illustrated, is mounted on a plurality of spacers 90 as by corresponding bolts 92. It will be appreciated that the lock screw 84 can be untightened and the rear shaft 76 rotated to incrementally adjust the orientation of the center winding 18. This provides a pitch adjustment means for rotating the center field winding along the orbital plane of the armature 38 from a first fixed position to a second fixed position. The performance of dynamo 10 can thereby be empirically optimized by adjusting the orientation of center winding 18 in this manner.

In a preferred embodiment of dynamo 10, mounting plates 60 and 62 are made of a magnetic isolation material, typically stainless steel. The magnetic insulation means thus provided generally contains the magnetic flux of center field winding 18 within the magnetic insulation means. This concentrates magnetic flux along the longitudinal axis of the center field winding 18 and directs the magnetic field strength towards the center winding's opposite ends 22, 24 to increase the magnetic attractive force between the center winding and the outer windings 28, 30. Thus, the magnetic conductance path of the dynamo is limited thereby reducing eddie currents losses during operation.

To further increase the magnetic field strength of the stator system, opposite ends 22, 24 of center winding 18 and inner ends 33 of outer windings 28, 30 are provided with means for increasing the magnetic conductance at each said end. As best seen in FIG. 6, this means includes opposite plates 94 and inner plates 96 which are formed of a high magnetic conductance metal, typically high carbon steel, and which are integrally or fixedly attached to opposite ends 22, 24 of center winding 18 and inner ends 33 of outer windings 28, 30, respectively. Additionally, outer plates 98 on the outer ends 34 of outer windings 28, 30 are also provided which are formed of a non-magnetic metal, typically stainless steel. Plates 98 direct the magnetic field strength of outer windings 28, 30 inwardly towards the center winding 18. As will be appreciated, the described configuration enhances the magnetic attraction between the stator elements. As shown in FIG. 3 and FIG. 6, the outer field windings 28, 30 are fixedly attached to the housing as by housing bolts 16 through mounting holes 100 (not shown in FIG. 3) on inner plates 96 and mounting holes 102 on outer plates 98.

FIG. 6 shows armature 38 is a flywheel type armature having a plurality of bipolar pole windings 40, each of which has opposite ends 44, 46. Each inner end 44 has a pole shoulder 104, integral with or fixedly attached to the inner end, made from a high magnetic conductance material, such as high carbon steel. In addition, each pole winding 40 includes a pole head 106 made of high magnetic conductance material, such as high carbon steel. By using high magnetic conductance materials for the pole shoulder 104 and pole head 106, it will be appreciated that stronger north and south magnetic poles are created for each pole winding 40. The pole windings' 40 magnetic field strength is further increased by using stacked parallel windings 108 on each pole winding to draw greater amperage to each pole winding. Each of the stacked windings 108 are connected in parallel within each pole winding 40, as illustrated in FIG. 8, with each pole winding set connected in electrical series with the next one by conductor 110. In the configuration shown in FIG. 8, the inventor has found it best to use four stacked parallel windings on each pole of pole winding 40 to enhance the overall field strength of armature 38.

As illustrated in FIG. 3 and FIG. 4, lateral offset mount 56 rotatably supports the front of each pole winding 40, by fixedly attaching each pole winding 40 to the inner facing surface of lateral offset mount 56, as by bolts 112 through bores 114 in pole shoulder 104 and pole head 106. When the mounting means 56 is made of non-magnetic material, such as stainless steel, it acts as a magnetic insulation means for the front of each armature pole winding 40.

An armature stabilizer, or stabilization means, 116, for damping vibration experienced by the armature means 38 during rotation, is provided in the form of a disk to reduce operational structural stresses on the armature 38 and reduce mechanical energy losses. Armature stabilizer 116 also secures each armature pole winding 40 in a coherent body to form the armature 38. FIG. 3 shows the rear side of each pole winding 40 is secured to the stabilizer 116, as by bolts 112 through bores 114 in the pole shoulder 104 and the pole head 106. Each pole winding 40 is thereby sandwiched in its position on the armature 38, thereby forming the armature, between the lateral offset mount 56 and the stabilizer 116 such that each pole shoulder 104 is electrically and magnetically discontinuous from each adjacent pole shoulder. It will be appreciated that the reduced electromagnetic interference between adjacent pole windings 40 increases the efficiency of the dynamo 10. When the stabilizer 116 is comprised of a non-magnetic material, such as stainless steel, it acts as the magnetic insulation means for the rear side of each armature pole winding 40. Stabilizer 116 is fixedly supported on a bearing 118 journaled on rear shaft 76. From the foregoing description, it will be appreciated that armature 38 is rotatably suspended with a degree of magnetic isolation, within the dynamo housing in a fixed turning relation with the front drive shaft 58.

As best illustrated in FIG. 6, a plurality of conductors 50 connect the first and second outer field windings 28, 30 in electrical series with each other, and connect the center winding 18 in electrical parallel with both outer windings 28, 30. As shown, all of the windings 26, 38 of the stator system are wound in a uniform direction so that the center field winding 18 and the outer windings 28, 30 are maintain in magnetic series to form the magnetic axis of the stator system. This is shown schematically in FIG. 7. As will be apparent to those of ordinary skill in the art, the windings do not have to be wound unidirectionally if voltages are properly applied to the stator elements so that the proper magnetic polarities are maintained to create the required magnetic axis. The electrical conductors 50 may also configure the field windings of the stator system in a series, shunt, or compound motor configuration. The important limitation is that the stator system field windings are maintained in magnetic series, as described above. The optimum efficiency of the dynamo, however, is believed to be achieved when the outer windings 28 and 30 are magnetically balanced with the center winding 18. Therefore, in the preferred embodiment of the present invention, using the equation B=CNI/L, where B=magnetic field strength, C=a constant, N=number of turns in the winding, I=current, and L=length of winding; the stator elements have similar area and permeability, the stator system is connected to one voltage source, the outer windings 28, 30 are in electrical series with respect to each other and in electrical parallel with the center winding 18, equal current is applied through each stator element, and the number of turns in the windings per unit length are equal.

Returning now to FIG. 3 and FIG. 6, brush elements 54 are provided, as shown, which cooperate with a conventional commutator 52 to transfer power between pole windings 40 during the revolution of armature 38 and a power source (not shown). The power source may either be a power supply or a power reservoir, when dynamo 10 is operating as a generator. As shown in FIG. 6, power is fed to and from the brush elements by connectors 119, which are connected between the power source and the brush elements 54 in parallel at the junction of connectors 50.

Commutator 52, in turn, is provided with a plurality of commutator segments 120, one of which is provided for each pole winding 40. Each segment 120 is electrically isolated from its adjacent segment by means of an electrical insulator 122 inserted therebetween. Each segment 120 is electrically connected via a conductor 124 to conductor 110.

A frequent source of efficiency reduction in electromagnetic dynamos is energy loss through brush sparking. As illustrated in FIG. 9, in the present invention each brush means 54 is provided with a primary brush element 126 which is physically connected to at least one secondary brush element 128 electrically isolated therefrom, as by electric insulator 130 placed between the brush elements. As shown, the secondary brush element 128 is connected in electrical parallel with primary brush 126 such that it has greater electrical resistance than the primary brush element 124 to allow an incremental decrease in voltage transmitted to the commutator segment 120 in motor mode. A sufficient transition period to downstep the voltage to the commutator segment with greatly reduced brush sparking is established when three secondary brush elements 128 are used, as shown in FIG. 9, wherein each successive brush element transmits 75% of the voltage transmitted by each preceding element. Of course, more brush elements may be used to further refine the transition decrements.

During operation, dynamo 10 experiences a voltage boost in its rotor and stator systems as each armature pole winding 40 reverses polarity. While this phenomena is not yet fully understood, it is believed to be caused by two effects. First, the counter emf's generated in each armature pole 40 as it rotates through the stator system magnetic axis, shown as line A-C in FIG. 7, are induced into the center winding 18 and conducted by conductors 50 to the other stator elements to boost stator system voltage. Second, voltage spikes, created in each pole winding 40 as it switches polarity, typically when breaking the stator system magnetic axis, are induced into center winding 18 and conducted by conductors 50 to the other stator elements to boost the stator system voltage. More specifically, as a pole winding 40 switches polarity at first gap 36, typically just prior to the pole winding 40 breaking the magnetic center axis of the stator system on line A-C, it is de-energized. The collapsing voltage in the pole winding 40 results in a voltage spike in the direction of the voltage reversal. This spike boosts the post-switch pole winding 40 voltage and strengthens the electromagnetic torque repelling the pole winding away from the stator system magnetic axis and towards the second gap 37 in the stator system. Further, the voltage spike is induced by transformer action into the center winding 18 and through the stator system by conductor 50 to boost the voltage of the stator system at the second gap 37. This further increases the electromagnetic torque provided to the armature pole as it approaches the second gap 37. When the pole winding 40 arrives at second gap 37, the voltage spike in the pole winding has not yet dissipated; this results in a greater voltage spike in the pole winding when the armature pole switches polarity at second gap 37. As the process is repeated, both stator system and armature system voltages are further boosted and the energy input to the stator and armature systems required to maintain rotation of the dynamo is decreased. The limiting factor is only where the voltage amplification leads to a saturation of the armature poles 40, as this decreases the performance of the dynamo 10. It will also be appreciated that as each pole winding 40 reverses magnetic polarity, the stator elements act as damper windings to maintain the voltage spike in the pole winding and reduce further voltage oscillations in the pole winding. Thereby, a cleaner transition to opposite polarity results.

While the foregoing is believed to accurately describe the phenomena occurring, it is certain that the addition of the physically continuous electromagnetic center winding 18 electrically connected to two outer windings 28, 30 in this configuration incrementally increases the power factor of the motor and its performance efficiency. A motor which could not propel a 2,500 pound truck without the center winding 18 was able to power the truck at an approximate average speed of 25 m.p.h. for approximately 45 minutes with the center winding 18 provided and electrically connected to the outer stator elements. Further, during stand alone testing of the dynamo 10, a maintained r.p.m. was observed with diminished amperage draw with the stator system in the above described configuration.

From the foregoing, it will be appreciated that the present invention provides an electromagnetic dynamo having improved construction and configuration which generates higher power output per given power input.

Specifically, a dynamo of improved efficiency is provided having a unique configuration which utilizes a physically continuous electromagnetic center winding electrically connected to two outer windings as part of a three piece stator system to enhance electromagnetic torque to the rotor. It will further be appreciated that counter-emf's and voltage spikes in the armature are utilized to raise the dynamo's stator and rotor system voltages during operation thereby further increasing its efficiency.

The invention has been described in detail with reference to a particular embodiment thereof, but it will be understood that various modifications can be effected within the spirit and scope of the invention.

I claim:

1. An electromagnetic dynamo comprising:
   an elongated center field winding having a physically continuous ferromagnetic core with two oppositely facing ends and windings wound around said core such that, when energized, a positive magnetic pole is created at one of said ends and negative magnetic pole is created at said opposite end;
   first and second outer field windings, each of which has a ferromagnetic body having oppositely facing inner and outer ends, said first and second outer field windings being generally centered about the longitudinal axis of said center field winding and spaced therefrom such that said inner facing ends face said ends of said center field windings forming a gap therebetween, each said ferromagnetic body having windings wound therearound such that, when energized, the magnetic polarity of each said inner end is opposite that of said end of said center field winding which it faces;
   armature means having a plurality of bi-polar armature pole windings for rotating said armature pole windings about said center field winding in the gaps between said opposite ends of said center field winding and said inner ends said outer windings, said armature means being centered about the longitudinal axis of said center field winding and oriented such that the longitudinal axis of said center field winding is generally parallel to the orbital plane of said armature means, said bi-polar windings each having a ferromagnetic core with oppositely facing ends and windings wound about its said core in a uniform direction which, when energized, create a positive magnetic pole at one of said ends and a negative magnetic pole at its opposite said end;
   commutator means for reversing the magnetic polarity of said bi-polar windings as said armature means rotates; and
   power transfer means cooperating with said commutator means for transferring electrical power between said armature pole windings and a power source.

2. An apparatus, as claimed in claim 1, further comprising:
   electrical connection means for electrically connecting said outer field windings and said center field winding to each other.

3. An apparatus, as claimed in claim 1, further comprising:
   pitch adjustment means fixedly attached to the center winding for rotating the center field winding along the orbital plane of the armature means from a first fixed position to a second fixed position.

4. An apparatus, as claimed in claim 1, wherein said center field winding and each said armature bi-polar windings have front and rear sides facing in opposite directions and wherein said dynamo further comprises:
   magnetic insulation means for magnetically insulating the front and rear sides of said center field winding and said armature bi-polar windings.

5. An apparatus, as claimed in claim 4, wherein:
   said magnetic insulation means includes magnetically insulating front plates mounted to the front sides of said center field winding and said bi-polar windings and magnetically insulating rear plates mounted to the rear sides of said center field winding and said bi-polar windings.

6. An apparatus, as claimed in claim 1, further comprising:
   a front drive shaft mounted in fixed coaxial relation with said armature means; and
   laterally offset mounting means for rotatably supporting said armature means about said center field winding, said laterally offset mounting means further rigidly connecting said drive shaft to said armature means such that said drive shaft is positioned to one side of said center field winding with the longitudinal axis of said drive shaft being perpendicular to that of said center field winding and axially aligned with the rotational axis of said armature means.

7. An apparatus, as claimed in claim 6, further comprising:
   armature stabilization means for damping vibration experienced by said armature means during rotation thereby reducing structural stresses on the armature during the dynamo's operation.

8. A dynamo, as claimed in claim 7, wherein:
   said laterally offset mounting means rotatably supports the front of each said armature pole winding and said armature stabilization means supports the rear of each said armature pole winding such that each winding is rotatably supported between said offset mounting means and said stabilization means physically independent of each adjacent pole winding.

9. An apparatus, as claimed in claim 1, further comprising:
   means for magnetically insulating said outside ends of said first and second outer windings, so that the magnetic flux of said first and second outer windings within said outside ends is generally contained therein.

10. An apparatus, as claimed in claim 1, further comprising:
    means for increasing the magnetic conductance of said inside ends of said first and second outer windings to increase the magnetic field strength between said inside ends and said opposite ends of said center field winding.

11. An apparatus, as claimed in claim 1, further comprising:
    means for increasing the magnetic conductance of said ends of said center field winding to increase the magnetic field strength between said ends and said inside ends of said first and second outer field windings.

12. An apparatus, as claimed in claim 1, further comprising:
    means for increasing the magnetic conductance of said ends of said armature bi-polar windings to increase the magnetic field strength between said ends and ends of said center field winding and said inner ends of said outer field windings.

13. An apparatus, as claimed in claim 1, wherein: said power transfer means is comprised of two or more brush elements having a common input line and physically connected such that the bodies of said elements are electrically isolated from each other.

14. An apparatus, as claimed in claim 13, wherein: each successive brush element has greater electrical resistance between itself and said input line than the preceding brush element.

15. An electromagnetic dynamo comprising:

an elongated center field winding having a physically continuous ferromagnetic core with two oppositely facing ends and windings wound around said core such that, when energized, a positive magnetic pole is created at one of said ends and negative magnetic pole is created at said opposite end;

first and second outer field windings, each of which has a ferromagnetic body having oppositely facing inner and outer ends, said first and second outer field windings being generally centered about the longitudinal axis of said center field winding and spaced therefrom such that said inner facing ends face said ends of said center field windings forming a gap therebetween, each said ferromagnetic body having windings wound therearound such that, when energized, the magnetic polarity of each said inner end is opposite that of said end of said center field winding which it faces;

armature means having a plurality of bi-polar armature pole windings for rotating said armature pole windings about said center field winding in the gaps between said opposite ends of said center field winding and said inner ends said outer windings, said armature means being centered about the longitudinal axis of said center field winding and oriented such that the longitudinal axis of said center field winding is generally parallel to the orbital plane of said armature means, said bi-polar windings each having a ferromagnetic core with oppositely facing ends and windings wound about its said core in a uniform direction which, when energized, create a positive magnetic pole at one of said ends and a negative magnetic pole at its opposite said end;

commutator means for reversing the magnetic polarity of said bi-polar windings as said armature means rotates;

power transfer means cooperating with said commutator means for transferring electrical power between said armature pole windings and a power source means;

a front drive shaft mounted in fixed coaxial relation with said armature means; and laterally offset mounting means for rotatably supporting the front of each said armature pole winding of said armature means about said center field winding, said laterally offset mounting means further rigidly connecting said drive shaft to said armature means such that said drive shaft is positioned to one side of said center field winding with the longitudinal axis of said drive shaft being perpendicular to that of said center field winding and axially aligned with the rotational axis of said armature means.

16. An electromagnetic dynamo comprising:

an elongated center field winding having a physically continuous ferromagnetic core with two oppositely facing ends and windings wound around said core such that, when energized, a positive magnetic pole is created at one of said ends and negative magnetic pole is created at said opposite end;

first and second outer field windings, each of which has a ferromagnetic body having oppositely facing inner and outer ends, said first and second outer field windings being generally centered about the longitudinal axis of said center field winding and spaced therefrom such that said inner facing ends face said ends of said center field windings forming a gap therebetween, each said ferromagnetic body having windings wound therearound such that, when energized, the magnetic polarity of each said inner end is opposite that of said end of said center field winding which it faces;

electrical connection means for electrically connecting said outer field windings and said center field winding to each other;

armature means having a plurality of bi-polar armature pole windings for rotating said armature pole windings about said center field winding in the gaps between said opposite ends of said center field winding and said inner ends said outer windings, said armature means being centered about the longitudinal axis of said center field winding and oriented such that the longitudinal axis of said center field winding is generally parallel to the orbital plane of said armature means, said bi-polar windings each having a ferromagnetic core with oppositely facing ends and windings wound its said core in a uniform direction which, when energized, create a positive magnetic pole at one of said ends and a negative magnetic pole at its opposite said end;

commutator means for reversing the magnetic polarity of said bi-polar windings as said armature means rotates;

power transfer means cooperating with said commutator means for transferring electrical power between said armature pole windings and a power source;

a front drive shaft mounted in fixed coaxial relation with said armature means; and laterally offset mounting means for rotatably supporting the front of each said armature pole winding of said armature means about said center field winding, said laterally offset mounting means further rigidly connecting said drive shaft to said armature means such that said drive shaft is positioned to one side of said center field winding with the longitudinal axis of said drive shaft being perpendicular to that of said center field winding and axially aligned with the rotational axis of said armature means.

17. An electromagnetic dynamo comprising:

an elongated center field winding having a physically continuous ferromagnetic core with two oppositely facing ends and windings wound around said core such that, when energized, a positive magnetic pole is created at one of said ends and negative magnetic pole is created at said opposite end;

first and second outer field windings, each of which has a ferromagnetic body having oppositely facing inner and outer ends, said first and second outer field windings being generally centered about the longitudinal axis of said center field winding and spaced therefrom such that said inner facing ends face said ends of said center field windings forming a gap therebetween, each said ferromagnetic body having windings wound therearound such that, when energized, the magnetic polarity of each said inner end is opposite that of said end of said center field winding which it faces;

electrical connection means for electrically connecting said outer field windings and said center field winding to each other;

armature means having a plurality of bi-polar armature pole windings for rotating said armature pole windings about said center field winding in the gaps between said opposite ends of said center field winding and said inner ends said outer windings, said armature means being centered about the longitudinal axis of said center field winding and oriented such that the longitudinal axis of said center field winding is generally parallel to the orbital plane of said armature means, said bi-polar windings each having a ferromagnetic core with oppositely facing ends and windings wound about its said core in a uniform direction which, when energized, create a positive magnetic pole at one of said ends and a negative magnetic pole at its opposite said end;

commutator means for reversing the magnetic polarity of said bi-polar windings as said armature means rotates;

power transfer means cooperating with said commutator means for transferring electrical power between said armature pole windings and a power source;

a front drive shaft mounted in fixed coaxial relation with said armature means;

laterally offset mounting means for rotatably supporting the front of each said armature pole winding of said armature means about said center field winding, said laterally offset mounting means further rigidly connecting said drive shaft to said armature means such that said drive shaft is positioned to one side of said center field winding with the longitudinal axis of said drive shaft being perpendicular to that of said center field winding and axially aligned with the rotational axis of said armature means; and armature stabilization means for damping vibration experienced by said armature means during rotation thereby reducing structural stresses on the armature during the dynamo's operation, said armature stabilization means further supporting the rear of each said armature pole winding such that each armature pole winding is fixedly mounted in its place on said armature means between said laterally offset mounting means and said armature stabilization means physically independent of each adjacent pole winding.

* * * * *